(12) United States Patent
Garmson

(10) Patent No.: US 11,912,318 B2
(45) Date of Patent: *Feb. 27, 2024

(54) WIRELESS VEHICLE MANAGEMENT SYSTEM

(71) Applicant: Arup Ventures Limited, London (GB)

(72) Inventor: Kenneth Garmson, Warren, NJ (US)

(73) Assignee: ARUP VENTURES LIMITED, London (GB)

( * ) Notice: Subject to any disclaimer, the term of this patent is extended or adjusted under 35 U.S.C. 154(b) by 556 days.

This patent is subject to a terminal disclaimer.

(21) Appl. No.: 17/107,735

(22) Filed: Nov. 30, 2020

(65) Prior Publication Data
US 2021/0078621 A1 Mar. 18, 2021

Related U.S. Application Data

(63) Continuation-in-part of application No. 16/723,261, filed on Dec. 20, 2019, now Pat. No. 10,850,753, (Continued)

(51) Int. Cl.
*B61L 15/00* (2006.01)
*B61L 3/00* (2006.01)
(Continued)

(52) U.S. Cl.
CPC ............ *B61L 15/0027* (2013.01); *B61L 3/006* (2013.01); *B61L 3/008* (2013.01); *B61L 3/125* (2013.01);
(Continued)

(58) Field of Classification Search
CPC ...... B61L 15/0027; B61L 3/006; B61L 3/008; B61L 3/125; B61L 15/0072; B61L 23/08; B61L 25/023; B61L 25/025; B61L 25/04; B61L 25/045; B61L 25/048; B61L 27/33; B61L 27/40; B61L 27/70; B61L 2027/204; G05D 1/028; G08G 1/0116; G08G 1/0141; G08G 1/017; G08G 1/02; G08G 1/052; G08G 1/096725; G08G 1/09675; G08G 1/096783; G08G 1/163; H04L 67/12

See application file for complete search history.

(56) References Cited

U.S. PATENT DOCUMENTS

| | | | | |
|---|---|---|---|---|
| 9,919,648 B1 * | 3/2018 | Pedersen | ............... | G06V 20/597 |
| 2009/0115638 A1 * | 5/2009 | Shankwitz | ........... | G08G 1/0104 |
| | | | | 340/988 |
| 2013/0300585 A1 * | 11/2013 | Zhu | ........................ | G08G 1/042 |
| | | | | 340/941 |

* cited by examiner

*Primary Examiner* — Peter D Nolan
*Assistant Examiner* — Demetra R Smith-Stewart
(74) *Attorney, Agent, or Firm* — Gearhart Law, LLC; David Postolski

(57) ABSTRACT

A transportation system is provided. The system includes: a highway vehicle, a first set of highway points located along a path of the vehicle, a second set of highway points located along a traffic signal section, at least one RFID tag located at each of the first set and the second set of highway points, and at least one RFID tag reader located on the highway vehicle connected to a network. The at least one RFID tag located at the first set of highway points is configured to store dynamic and static characteristics of the highway vehicle as it passes the first set of highway points and the at least one RFID tag located at the second set of highway points is configured to store dynamic and static characteristics of the vehicle as it passes the second set of highway points.

18 Claims, 14 Drawing Sheets

Related U.S. Application Data which is a continuation-in-part of application No. 15/992,883, filed on May 30, 2018, now Pat. No. 10,518,790, which is a continuation of application No. 15/878,157, filed on Jan. 23, 2018, now abandoned.

(51) Int. Cl.
| | |
|---|---|
| *B61L 3/12* | (2006.01) |
| *B61L 23/08* | (2006.01) |
| *B61L 25/02* | (2006.01) |
| *B61L 25/04* | (2006.01) |
| *B61L 27/00* | (2022.01) |
| *B61L 27/33* | (2022.01) |
| *B61L 27/40* | (2022.01) |
| *B61L 27/70* | (2022.01) |
| *B61L 27/20* | (2022.01) |

(52) U.S. Cl.
CPC ........... *B61L 15/0072* (2013.01); *B61L 23/08* (2013.01); *B61L 25/023* (2013.01); *B61L 25/025* (2013.01); *B61L 25/04* (2013.01); *B61L 25/045* (2013.01); *B61L 25/048* (2013.01); *B61L 27/33* (2022.01); *B61L 27/40* (2022.01); *B61L 27/70* (2022.01); *B61L 2027/204* (2022.01)

VEHICLE COMMUNICATION PATHS

From FIG.5C

TYPICAL HIGHWAY EQUIPMENT

| ACORN TAG TYPE 1 | ACORN TAG TYPE 1 | ACORN TAG TYPE 1 | ACORN TAG TYPE 1 | ACORN TAG TYPE 1 | ACORN TAG TYPE 1 | ACORN TAG TYPE 1 | ACORN TAG TYPE 1 | ACORN TAG TYPE 1 | ACORN TAG TYPE 1 | ACORN TAG TYPE 1 | ACORN TAG TYPE 1 | ACORN TAG TYPE 1 |

FIG.5D

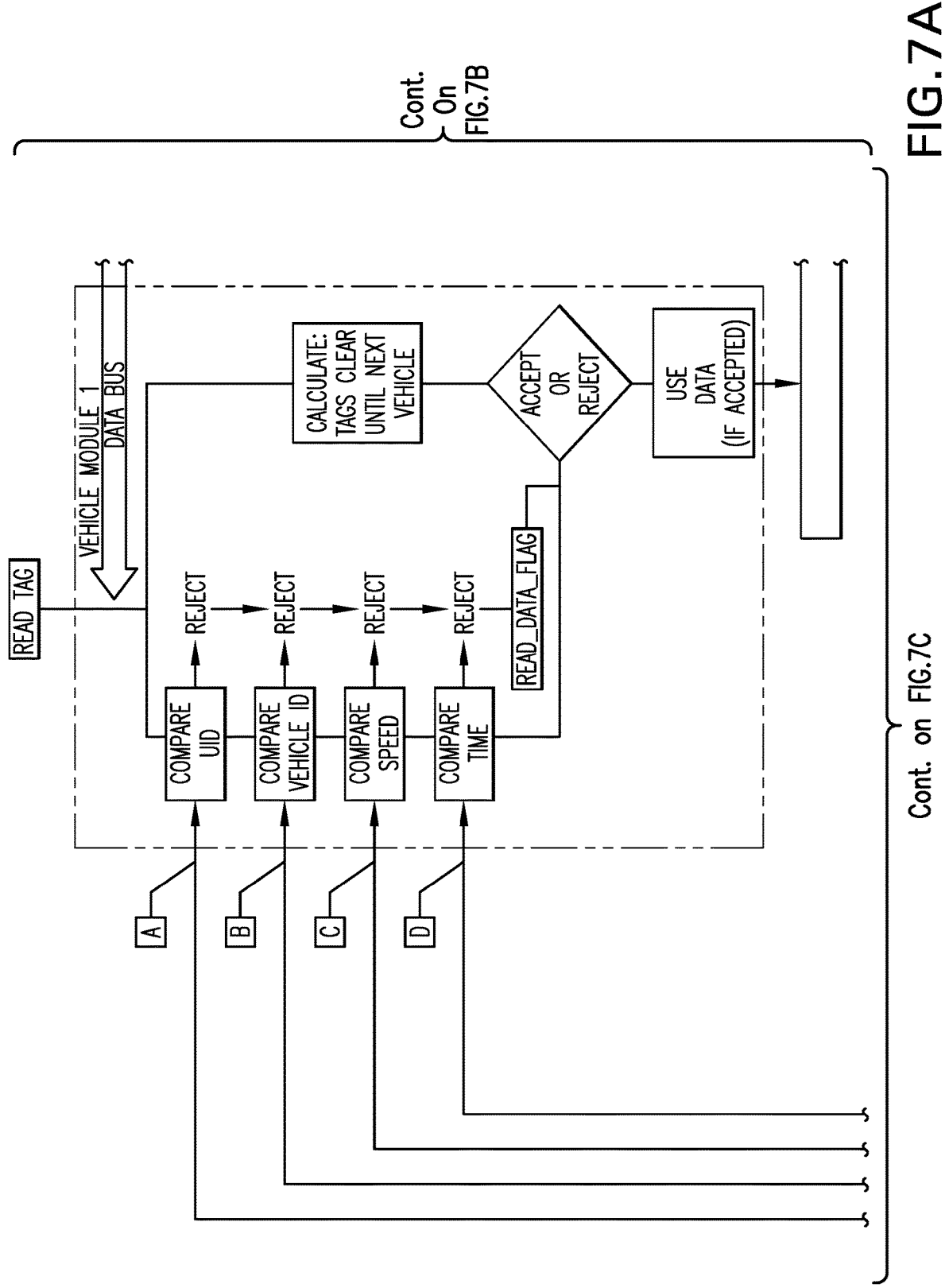

WIRELESS VEHICLE MANAGEMENT SYSTEM

CROSS-REFERENCE TO RELATED APPLICATIONS

This application is a United States Continuation-in-Part (CIP) and Non-Provisional Patent Application that claims priority to U.S. Non-Provisional patent application Ser. No. 16/723,261 filed on Dec. 20, 2019, which is a United States CIP Patent Application of U.S. Non-Provisional patent application Ser. No. 15/992,883 filed on May 30, 2018 and patented as U.S. Pat. No. 10,518,790 on Dec. 31, 2019, which is a Continuation of U.S. Non-Provisional patent application Ser. No. 15/878,157 filed on Jan. 23, 2018, the entire contents of which are incorporated herein by reference in their entirety.

FIELD OF THE EMBODIMENTS

The field of the present invention and its embodiments relate to a system and method of managing vehicle positions, distances, speeds, and locations within a system.

BACKGROUND OF THE EMBODIMENTS

Advances in data storage and processing now enable far greater digital applications to occur in much smaller footprint and at a fraction of the cost. Along with hardware advances and widespread availability, the adjoining software development has become a much more common skill and is approaching the same commonality as reading and writing skills.

With many of the industrialized nations and cities around the world having to come to grips with their aging public transportations systems a need and an opportunity arose for a modern approach to overseeing these systems. In recent years, multiple disclosures have attempted to fix various aspects of existing systems. Various systems and methodologies are known in the art. However, their structure and means of operation are substantially different from the present disclosure.

REVIEW OF RELATED TECHNOLOGY

U.S. Pat. No. 9,669,850 pertains to a method and system for monitoring rail operations and transport of commodities via rail, a monitoring device including a radio receiver is positioned to monitor a rail line and/or trains of interest. The monitoring device including a radio receiver (or LIDAR) configured to receive radio signals from trains, tracks, or trackside locations in range of the monitoring device. The monitoring device receives radio signals, which are demodulated into a data stream. However, this disclosure requires memory storage of the trains' activities at a central location instead of on the RFID tags.

U.S. Pub. 2017/0043797 pertains to Methods and systems that utilize radio frequency identification (RFID) tags mounted at trackside points of interest (POI) together with an RFID tag reader mounted on an end of train (EOT) car. The RFID tag reader and the RFID tags work together to provide information that can be used in a number of ways including, but not limited to, determining train integrity, determining a geographical location of the EOT car, and determine that the EOT car has cleared the trackside POI along the track. This publication discloses storing memory on the RFID tags but does not disclose having the memory be volatile.

U.S. Pat. No. 9,711,046 pertains to a control system presenting a configurable virtual representation of at least a portion of a train and associated train assets, including a real-time location, configuration, and operational status of the train and associated train assets traveling along a railway. The control system may include a train position determining system, (such as RFID) and a train configuration determining system.

Various systems are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

In general, the present invention and its embodiments describe a system and method of managing vehicle positions, distances, speeds, and locations within a vehicle system.

A first embodiment of the present invention describes a vehicle control system. The vehicle control system includes: at least one highway vehicle, at least one first set of two highway points located along a path of the at least one highway vehicle, and at least one first RFID tag located at each of the at least one first set of two highway points and configured to store dynamic and static characteristics of the at least one highway vehicle as it passes the at least one first set of two highway points. The vehicle control system also includes: at least one second set of two highway points located along a traffic signal section and at least one second RFID tag located at each of the at least one second set of two highway points configured to store dynamic and static characteristics of the at least one highway vehicle as it passes the at least one second set of two highway points.

The vehicle control system further includes: at least one RFID tag reader located on the at least one highway vehicle connected to a network. The at least one RFID tag reader comprises an RF transparent enclosure containing inside at least a pair of reader antennas wired to a chip reader, connected to the at least one highway vehicle. In other examples, the at least one RFID tag reader is located on an underside of the at least one highway vehicle.

In examples, the at least one first RFID tag comprises a first RFID Type 1 tag and the at least one second RFID tag comprises a first RFID Type 2 tag. Further, the at least one first RFID tag and the at least one RFID tag reader have a separation in a range between approximately 7 inches and approximately 40 inches. Moreover, in examples, the at least one first RFID tag comprises multiple type 1 RFID tags spaced apart by less than approximately 30 feet from each other. Moreover, the first RFID Type 2 tag is connected to a second RFID Type 2 tag by an RS485 or serial data transmission cable. The first RFID Type 2 tag comprises an I2C to RS485 converter connected to an RFID chip connected by I2C BUS connection, connected by a parallel connection to a tag antenna.

In other examples, the at least one highway vehicle is connected to a wireless communication network comprising an Ultra-Wide Band, LWIP, LWA, WLAN, ADSL, Cable, or LTE network at locations where the at least one first set of two highway points or the at least one second set of two highway points are at an open highway. Furthermore, the vehicle control system may also include another highway vehicle.

A second embodiment of the present invention describes a method of controlling a vehicle system. The method includes: communicating from a first vehicle to a second vehicle via a centralized data network traffic management center. The centralized data network traffic management center comprises a highway database, a schedule database, and a route database. The method also includes: communicating from the first vehicle to the second vehicle via a communication system. The communication system comprises: at least a first set of two highway points located along a path of the first vehicle, at least a second set of two highway points located along a traffic signal, and at least one first RFID tag located at the at least the first set of two highway points. The at least one first RFID tag is configured to store dynamic and static characteristics of the first vehicle as it passes the at least the first set of two highway points.

The communication system further includes: at least one second RFID tag located at the at least the second set of two highway points. The at least one second RFID tag is configured to store dynamic and static characteristics of the vehicle as it passes the at least the second set of two highway points. The communication system also includes: at least one first RFID tag reader located on the first vehicle and at least one second RFID tag reader located on the second vehicle. In some examples, the communication system further comprises: a backup or a fail-safe system.

The first vehicle communicates parameters to the second vehicle via the communication system. Further, the parameters are selected from the group consisting of: a speed of the first vehicle, a location of the first vehicle, and/or a headway of the first vehicle, among others. In examples, the at least one first RFID tag comprises a first RFID Type 1 tag and the at least one second RFID tag comprises a first RFID Type 2 tag. The first RFID Type 1 tag or the first RFID Type 2 tag of the backup system stores a speed, a brake status, a vehicle ID, a traffic signal status, a time stamp, and a schedule of a latest vehicle to pass the first RFID Type 1 tag or the first RFID Type 2 tag. In examples, each of the first RFID Type 1 tag and the first RFID Type 2 tag comprise unique identifiers. Moreover, in further examples, each of the first RFID Type 1 tag and the first RFID Type 2 tag comprise volatile memory.

In examples, the method may further include: rewriting the speed, the brake status, the vehicle ID, the traffic signal status, the time stamp, and the schedule of the latest vehicle to pass the first RFID Type 1 tag or the first RFID Type 2 tag with a next vehicle to pass the first RFID Type 1 tag or the first RFID Type 2 tag. The rewriting step is completed within a time range of approximately 10 milliseconds to approximately 30 milliseconds.

DESCRIPTION OF THE PREFERRED EMBODIMENTS

Figure 1:
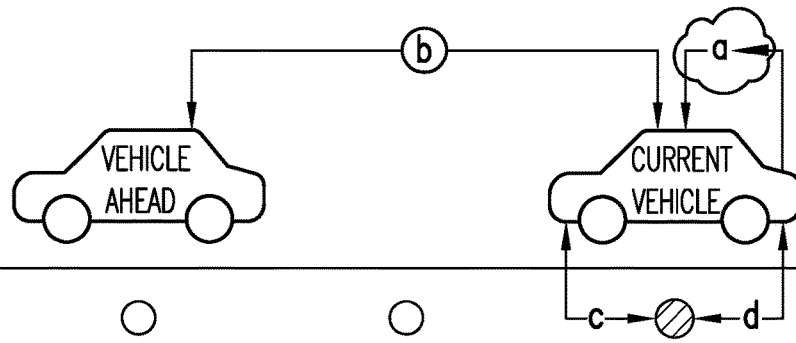
FIG. 1 shows three modes of operation of a system, according to at least some embodiments disclosed herein.
Figure 1:
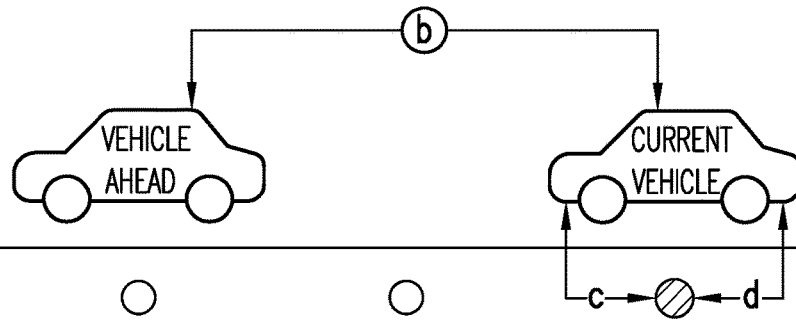
Figure 1:
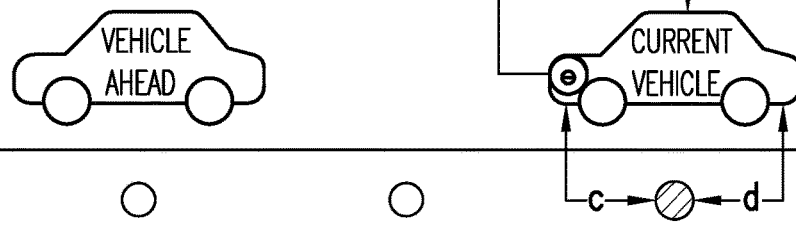

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The present invention, hereinafter referred to as the "Acorn" system, describes a system that has been designed to allow vehicles to operate along a highway autonomously. At the center of the Acorn design is the placement of Acorn Tags at an interval typically 10-30 feet, but preferably at 25 feet along the highway. Along straight (or through) highway areas, Type 1 Acorn Tags are placed at the typical interval with no hardwire connections. At traffic signal and crossing locations, Type 2 Acorn Tags are deployed at the typical interval with series hardwired connections simulating highway circuits used to control traffic signals. These simulated highway circuits can interface with the traffic signal controller.

Below, in systems operating at 90 mph, only one Acorn tag and reader interface method is required to achieve a successful read write cycle, simplifying the installation. However, if a deployment needs to support speeds greater than 90 mph, the system can be configured, as is, to leverage a split read write cycle to continue achieving a successful read write cycle.

It should be appreciated that the Acorn System is an open protocol based system, allowing software applications to be available from multiple vendors and sources, and the system being adaptable to various systems around the world, using multiple operating systems on different hardware and software platforms. This approach, as with the supply of the Acorn Tags, does not lock the Acorn system into a single supplier of the system. Furthermore, this approach removes common failure modes in both software and hardware of the system.

Referring now to FIG. 1, a method for controlling a vehicle system is illustratively depicted, in accordance with an embodiment of the present invention. According to an embodiment, a first vehicle communicates to a second vehicle via a centralized data network using radio controlled communication (e.g., a traffic management center), where the traffic management center includes a highway database, a schedule database, and a route database. The first vehicle may also communicate to the second vehicle via a back-up communication system.

According to an embodiment, the system architecture used in the present method enables several layers of communication to transmit and receive the critical data on-board to calculate safe headway. These layers of communication help form the three modes of operation (labelled at 1, 2, and 3 in FIG. 1) to ensure the continuous safe operation of the vehicles. Mode 1 of FIG. 1 uses all layers of technology to provide the systems minimum headway, leading Mode 1 to be the primary and, thus, normal mode of operation. According to an embodiment, in Mode 1, normal operation calculates headway with the following redundant inputs: traffic management center broadcasted schedule updates and vehicle location confirmations (a); vehicle to vehicle broadcasted vehicle location confirmations (b); tag read vehicle ahead time and speed (c); tag read current vehicle location confirmation (d); and LIDAR enabled highway visual range sensing clear distance ahead (e).

According to an embodiment, the subsequent mode of operation, Mode 2 in FIG. 1, is reduced and engages when the traffic management center communication is lost, but allows the system to continue functioning by increasing the minimum headway. Lastly, Mode 3 of FIG. 1 shows autonomous operation that enables total vehicle autonomy by relying on tags and on-board equipment information only, imposing the most restrictive headway.

According to an embodiment, the backup communication system includes: a first vehicle, a second vehicle, at least a first set of two highway points, at least a second set of two highway points, at least one RFID Type 1 tag, at least one RFID Type 2 tag, and at least one RFID tag reader. It should be appreciated that the quantity of the vehicles is not limited to any particular quantity. Moreover, the quantity of the at least the first set of two highway points and the at least the second set of two highway points is not limited to any particular quantity.

The at least the first set of two highway points is located along a path of the first vehicle. The at least the second set of two highway points is located at a traffic signal. Moreover, the at least one RFID Type 1 tag is located at the at least the first set of two highway points and is configured to store characteristics of the first vehicle as it passes the at least the first set of two highway points. Further, the at least one RFID Type 2 tag is located at the at least the second set of two highway points and is configured to store characteristics of the vehicle as it passes the at least the second set of two highway points. The at least one RFID tag reader is located on the first vehicle and on the second vehicle.

The RFID type 1 tag or the RFID type 2 tag of the back-up system can store numerous parameters, such as: a speed, a brake status, a vehicle ID, a traffic signal status, a time stamp, and/or a schedule of the latest vehicle to pass the RFID type 1 tag or the RFID type 2 tag, among other parameters. The parameters (e.g., the speed, the brake status, the vehicle ID, the traffic signal status, the time stamp, and the schedule of the latest vehicle to pass the RFID type 1 tag or the RFID type 2 tag) that are recorded on the tags can be rewritten with information with the next vehicle to pass the RFID type 1 tag or the RFID type 2 tag. The read and write step can be typically completed within between approximately 10 milliseconds and approximately 30 milliseconds, but optimally 20 milliseconds is preferred for safe operation of the system.

Each vehicle (e.g., the first vehicle and the second vehicle) can track three principle databases onboard, which include: the highway database, the schedule database, and the route databases. The highway database contains details of the highway network and makes use of the tag unique ID ("UID") as the key for the entry record of that location. The temporary speed field is variable and all other fields (e.g., the highway speed limit field, the next approaching vehicle field, the visual range field, the next way point field, etc.) are fixed unless maintenance has changed a tag. The schedule database allows the vehicle to determine its location in relationship with other vehicles in the system. All fields (e.g., the vehicle ID field, the planned route field, the planned time field, and the confirmed time field) can be preloaded or can be updated throughout the journey. The route database can contain the information required to navigate the highway system. This database contains information pertaining to the expected location of the individual vehicle in relation to time. The location is based on the tag UIDs.

Using the current UID and the vehicle ID, the planned time field can be accessed to determine if the vehicle is ahead or behind of the planned schedule. For operation during Mode 2 and Mode 3, the planned location may be determined using the vehicle ahead ID and time. The Acorn System databases can be programmed to have in excess of 100,000 records. On the initial startup, a search of all the databases to locate the current tag UID entry and schedule location may take up to a second to locate the record. Fast indexing will be used thereafter as records will be accessed sequentially, hence incremental increase or decrease.

Vehicle spacing is achieved by establishing the vehicle location from tags and inertial navigation system, to an accuracy of at least +/−12.5 ft. This data will be stored by the on-board network map and may be broadcasted to all vehicles along the route. The on-board network map also updates with vehicle locations that it receives from other vehicle broadcasts. Allowing the vehicle computers to calculate the distance to the vehicle ahead, target speed, and braking point to maintain a safe operating distance. The tag has data fields for the time of the last vehicle, the speed, and the running status. With no other received data, this enables an on-board calculation to determine where the vehicle ahead is, if it had applied its emergency brakes. As a vehicle updates, it will broadcast its location to all other vehicles along the route every 100 ft or as determined by the vehicles operating speed.

To calculate the target speed and available headway for a vehicle for use in Mode 2 and Mode 3, the onboard processors can adhere to the following processes:

Headway—the Tag Sequence Array, preloaded from the highway database, can be used to calculate a distance (in number of tags clear) to the vehicle ahead. This value can be known as the "Clear Tags" value. The tag location of the vehicle ahead can be obtained by the following methods: in Mode 1, the highway database holds the current location of the vehicle ahead. The location can be confirmed via a transmission from the vehicle ahead and a validation that has come from the traffic management center. If the location of the vehicle ahead has been received but not validated by the traffic management center, then Mode 2 is invoked. Using the preceding vehicle's speed and the time when the vehicle was at the tag, the ahead vehicle's location can be predicted assuming a constant speed. This estimated vehicle ahead location is compared to the planned location of that vehicle with the highway database and with the reported location from the vehicle. The lower number of the two numbers is used to set the value in the Clear Tags field or value.

If the vehicle has not received any vehicle status updates for more than 500 mS, then Mode 3 will be invoked. In Mode 3, the vehicle calculates the number of clear tags ahead from the tag data received and uses the scheduled location to amend the tag clear value as required. The Highway Visual Range will be used to modify the maximum speed permissible. From the obtained Tag Clear value, the vehicle length (converted to number of tags) is subtracted. This becomes the planned stop tag for the vehicle. The number of headway tags is then used to address on-board databases to determine the maximum speed that the vehicle can operate at if it is to stop by the stop tag. The maximum speed derived from the on-board databases will then be compared to the highway speed and the temporary speed. The lowest value will be chosen. The data received allows the vehicle to calculate the speed and brake profile of the vehicle ahead.

To determine the speed of the vehicle, an Interrupt Request (IRQ) can be used to start a timer sequence that will amount the time between tag reads. The counter will be 64 bit using a 100 µS interval enabling the average speed to be determined using the known tag spacing between tags. At a speed of 10 mph, the counter will reach an integer value of 15,957 between tag readings at the tag spacing, as calculated by the formula below. This counter value could be used to calculate the location of a vehicle between tags, based on the average speed calculated between the previous tags.

$$(\text{velocity}) \left[ \frac{\text{ft}}{\text{sec}} \right] = \frac{25(\text{tag distance})[\text{ft}]}{x(\text{integer count}) * 100 \, [\mu S]} * \frac{1{,}000{,}000}{1[\text{sec}]}$$

$$10 \left[ \frac{\text{miles}}{\text{hour}} \right] = 15.667 \left[ \frac{\text{ft}}{\text{sec}} \right] = \frac{25}{1750} * 10{,}000$$

For example, using the equations above, with a vehicle traveling at 10 mph, an accurate location and speed calculation occurs every 1,596 mS, thus an accurate location and speed can be broadcasted to the traffic management center and other vehicles every 1,596 mS. As the speed of the vehicle increases, the travel time decreases, allowing for higher broadcast frequency of accurate location and speed values. For example, at an average speed of 25 mph, location updates will occur every 682 mS, and at 60 mph every 284 mS.

The Wide Area Network (WAN) Communications may use various technologies and networks to provide various levels of connectivity along different types of highway areas. Ideally, communications should exist along the entirety of the highway system to support broadcasted vehicle locations as mentioned above, although continuous WAN communication is not required to continue operations. The broadcasted vehicle locations requires only 1024 bits for data transmission and 1024 bits for confirmation acknowledgement, and thus minimal communications is required along the entirety of the highway route system.

In addition to vehicle locations, the WAN Communications will need to support schedule updates from the traffic management center to each vehicle. Unlike vehicle locations, schedule updates require reasonable bandwidth and will need to be supported by high bandwidth networks. Reasonable locations where high bandwidth communications should exist are stations and traffic signal locations, also known as waypoints.

Figure 6A:
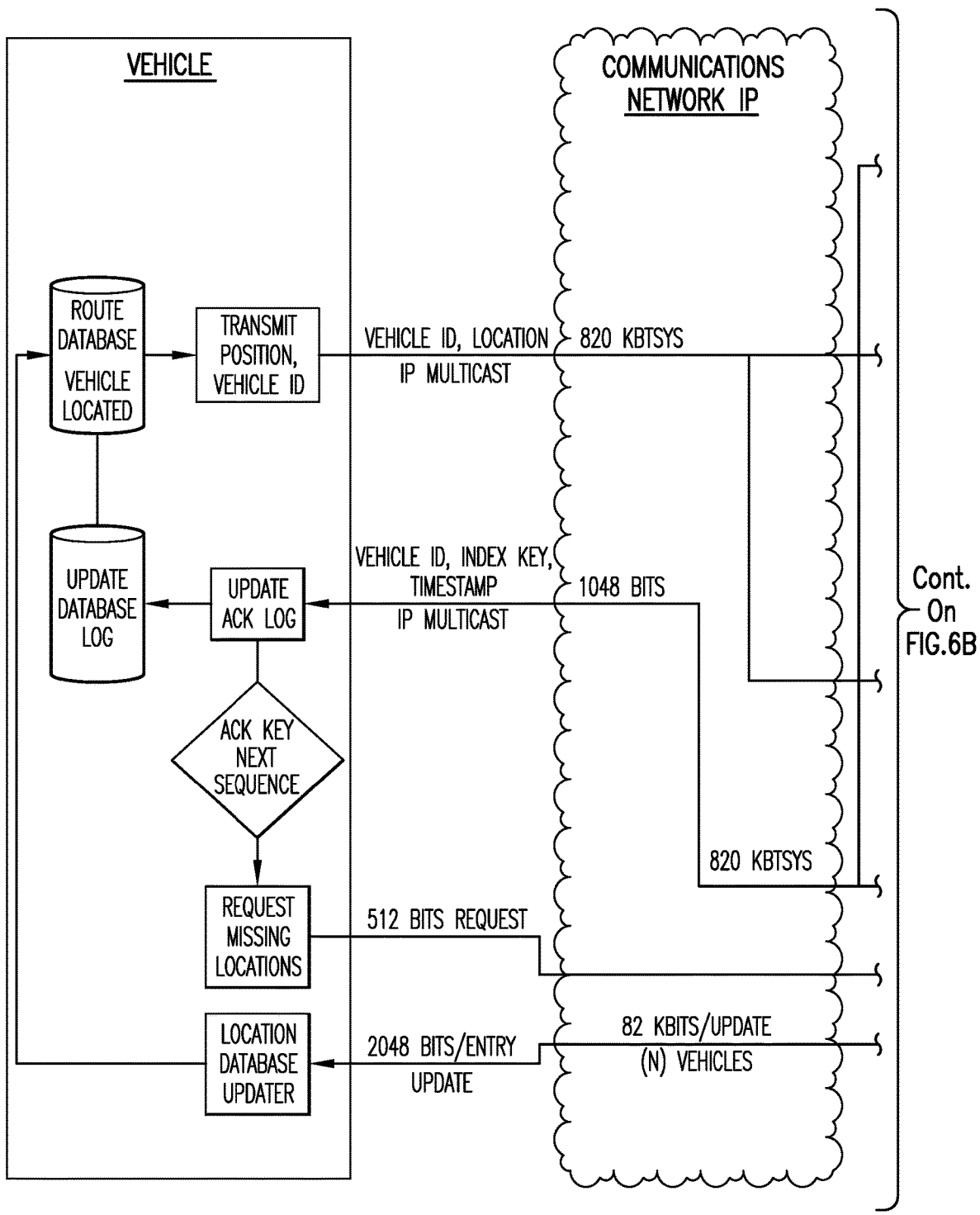
FIG. 6 shows a data flow diagram of an embodiment of a system.
Figure 6B:
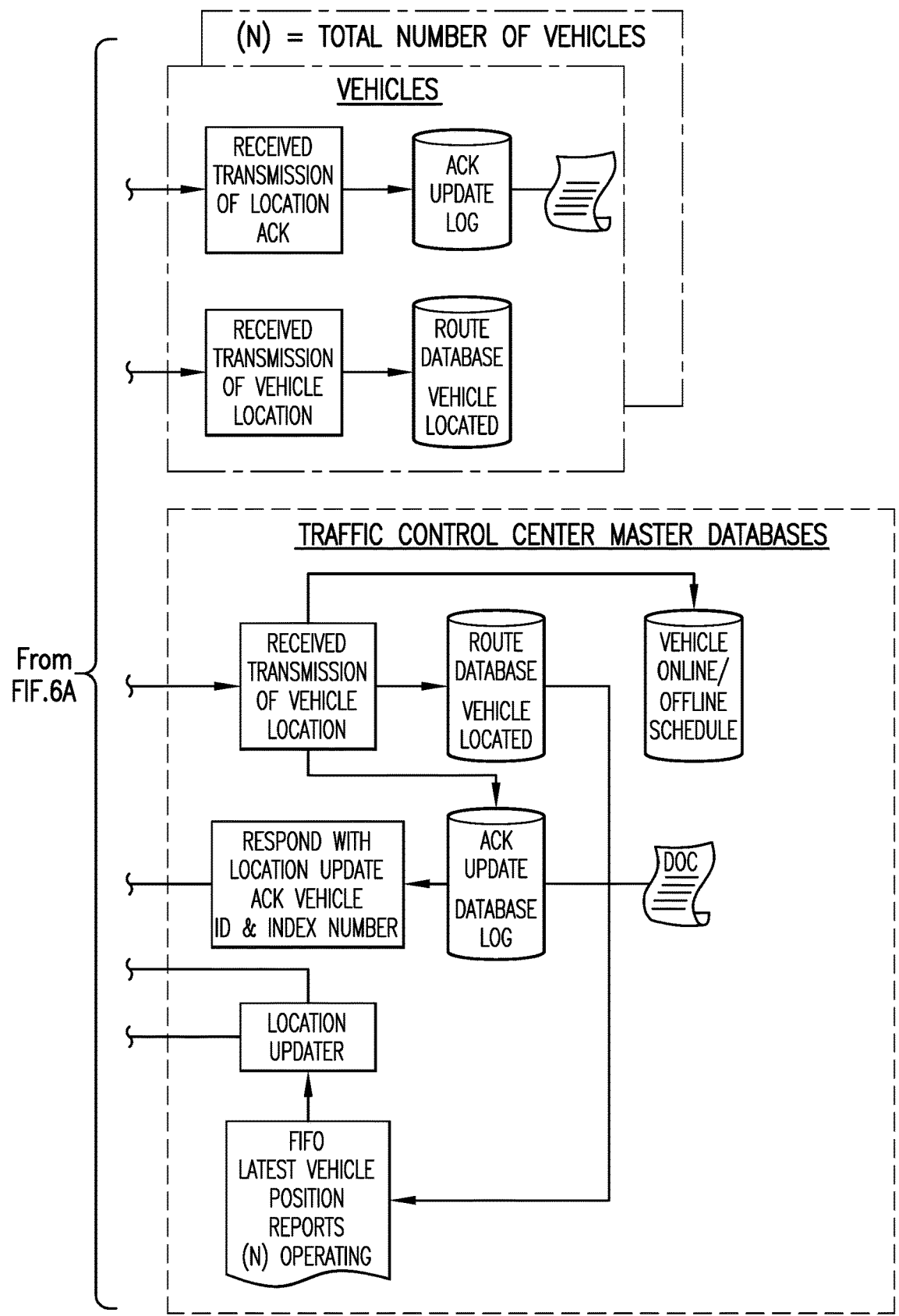
Figure 7B:
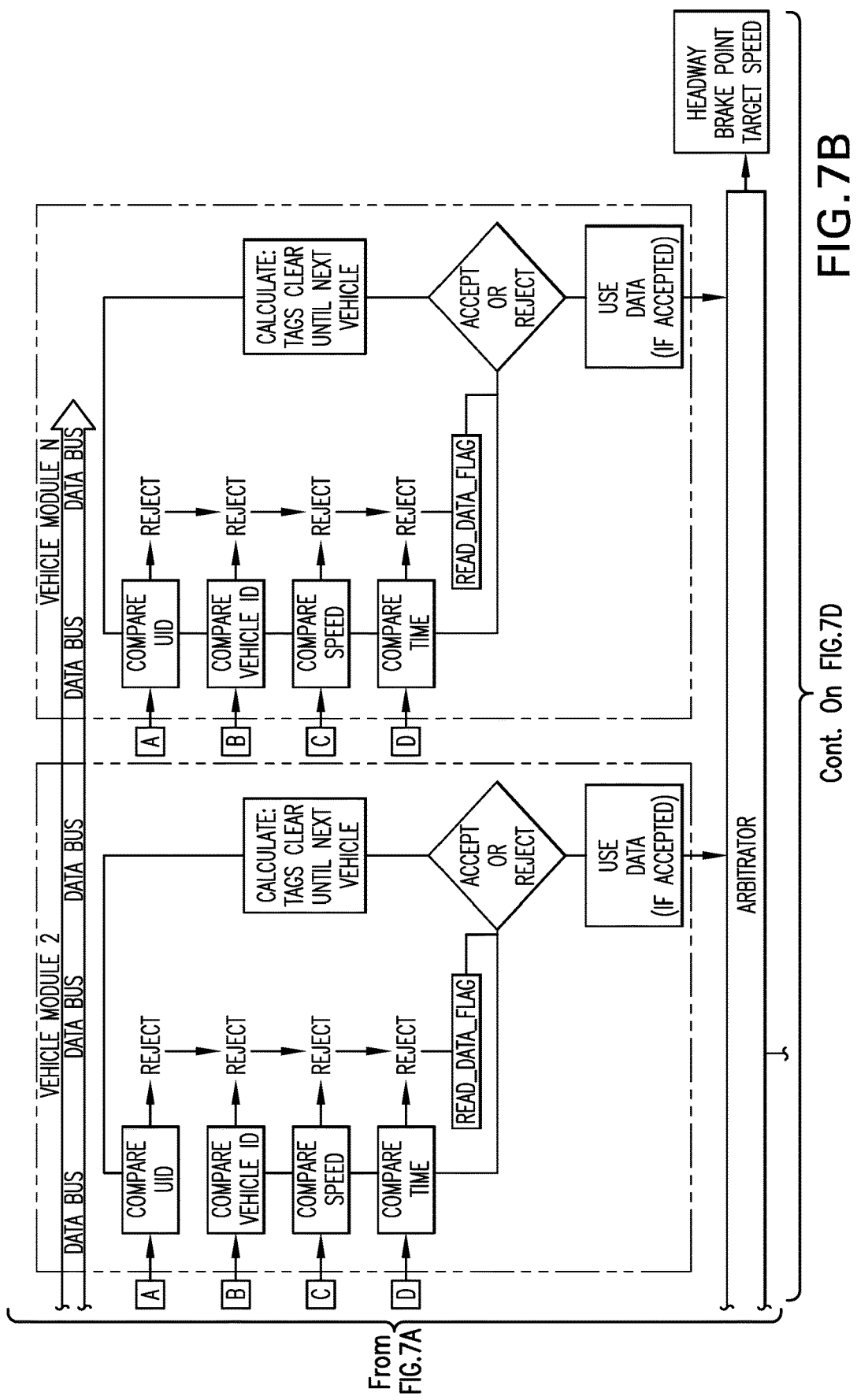
FIG. 7 shows a data verification of an embodiment of a system.
Figure 7C:
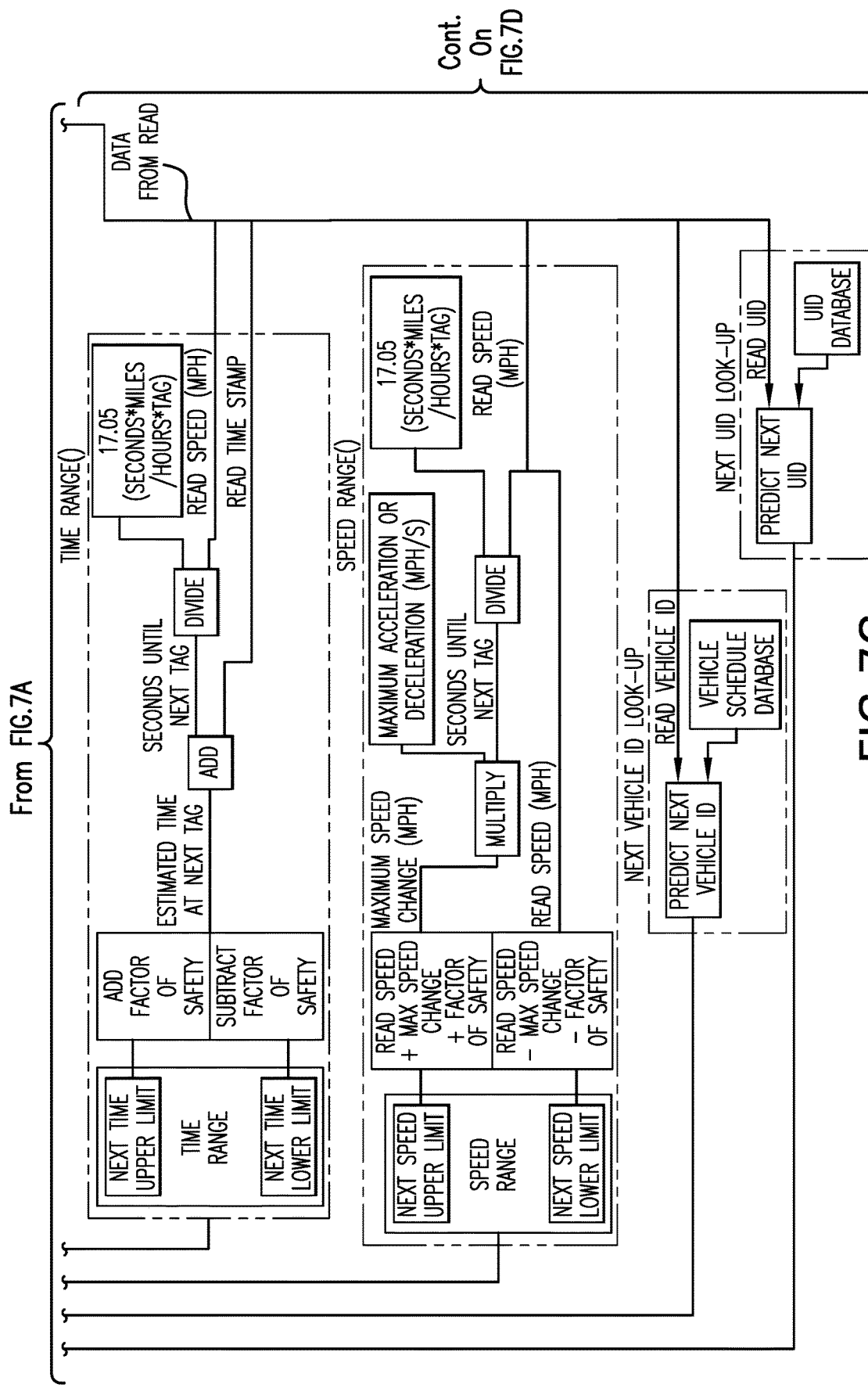
Figure 7D:
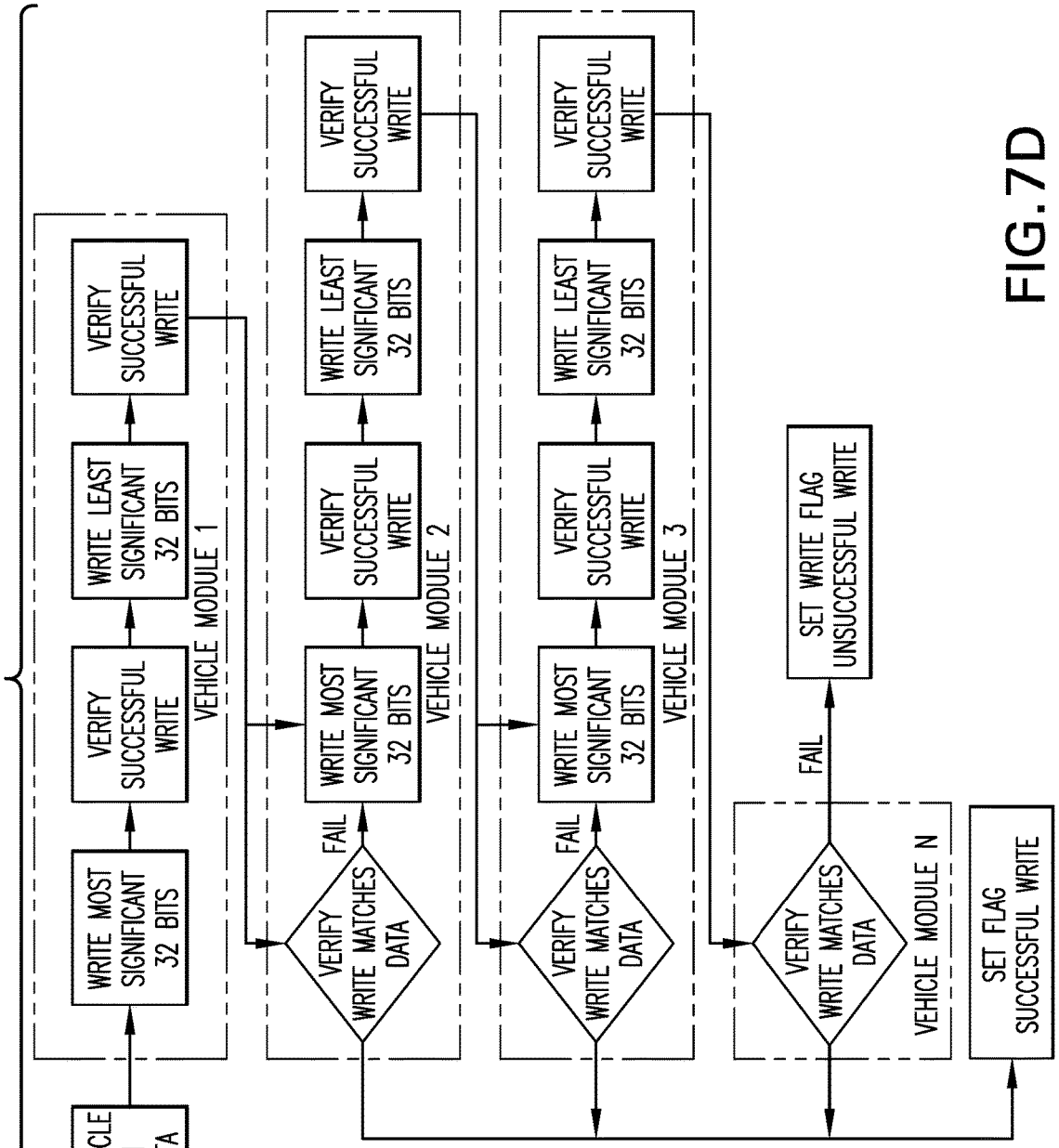

Then, the number of records to be updated is approximately 250 kB. Allowing for 16CRC, data verification, and other communication overhead, updating a record of a single vehicle would be 6 Mb, and for a complete schedule update 400 Mb (50 MB). It is noted that various embodiments of the present invention, such as communication and data updating (FIG. 6) and data verification (FIG. 7) can be presently found in one or more of the present figures (FIG. 1, FIG. 2, FIG. 3, FIG. 4, FIG. 5, FIG. 6, and FIG. 7).

This reduction in coding enables verification to a SIL rating much quicker, as the lines of code are less and multiple vendors can be engaged to provide the code.

At the traffic signal locations, an Acorn Type 2 Tag can be installed for a typical distance of 4,000 feet leading into the actual traffic signal. The Type 2 Tag will allow the traffic signal/ARS to communicate with the onboard systems providing status of traffic signal position and target speed for that location.

Figure 2:
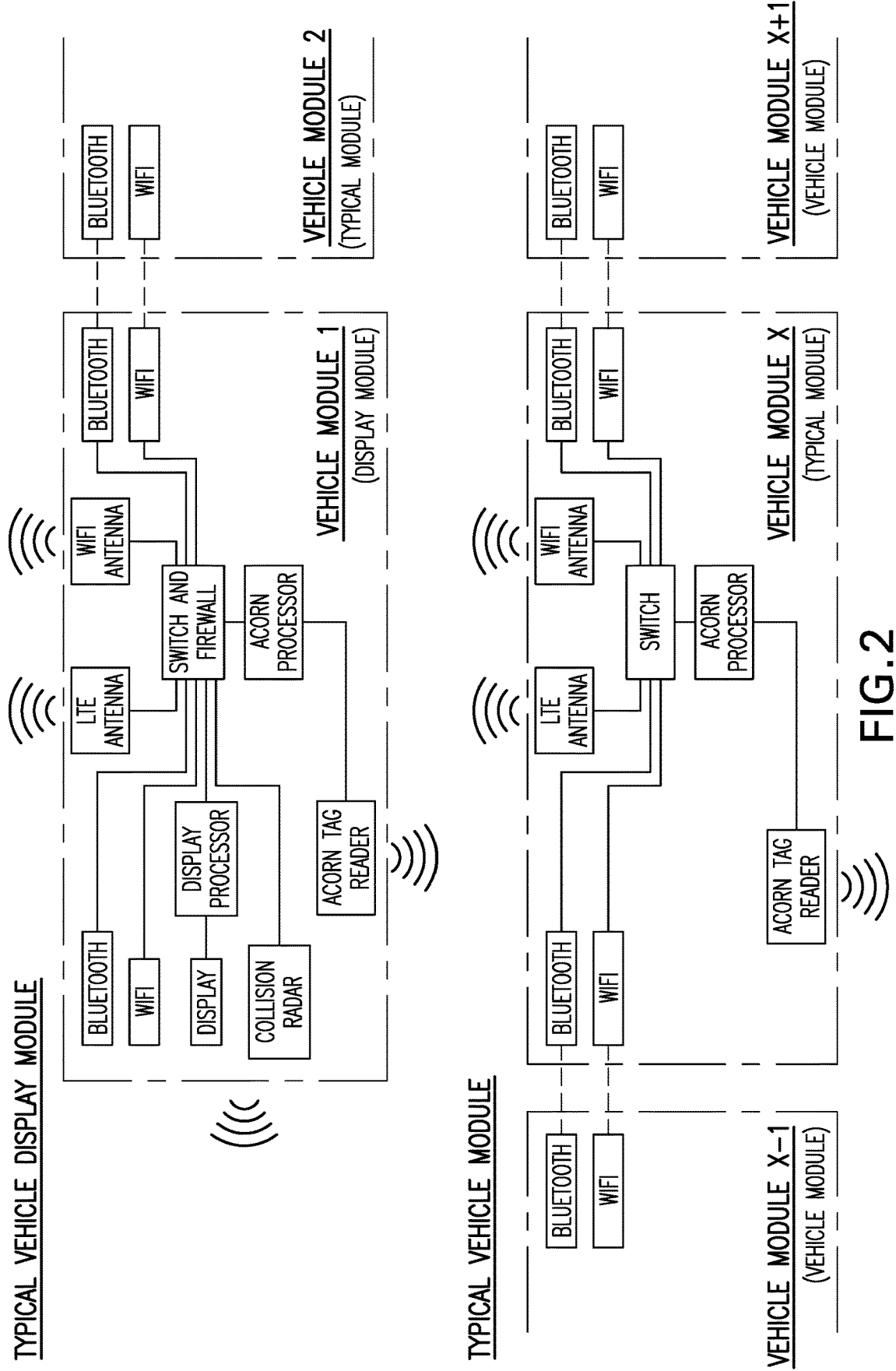
FIG. 2 shows an embodiment of a vehicle set up, according to at least some embodiments disclosed herein.

Referring now to FIG. 2, a vehicle control system is illustratively depicted in accordance with an embodiment of the present invention, where the system includes at least one leading vehicle, at least one RFID tag reader located on the at least one leading vehicle, and at least one trailing vehicle connected to a network. According to an embodiment, the RFID tag reader, located on the at least one leading vehicle (as shown in FIG. 2), can include an RF transparent enclosure containing inside at least a pair of reader antennas wired to a chip reader, connected to at least one vehicle.

According to an embodiment, the network database on the at least one leading vehicle can be connected to the network database on the at least one trailing vehicle by a communication backbone tying together diverse networks, such as Bluetooth and Wi-Fi connections. Moreover, the network of the at least one leading vehicle and/or the at least one trailing vehicle can include radar.

Figure 4:
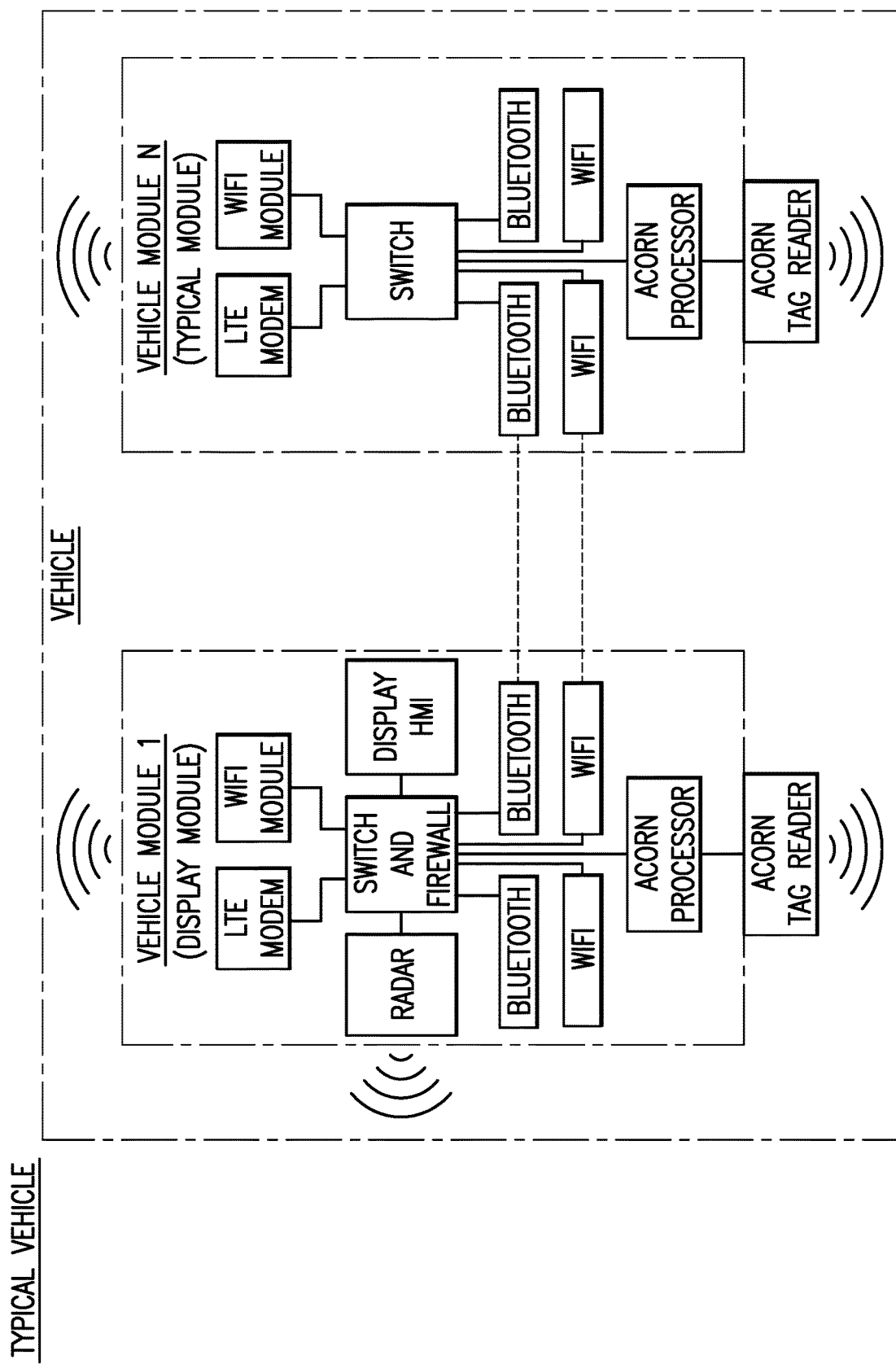
FIG. 4 shows a detail of an operational schematic of an embodiment of a system.
Figure 5A:
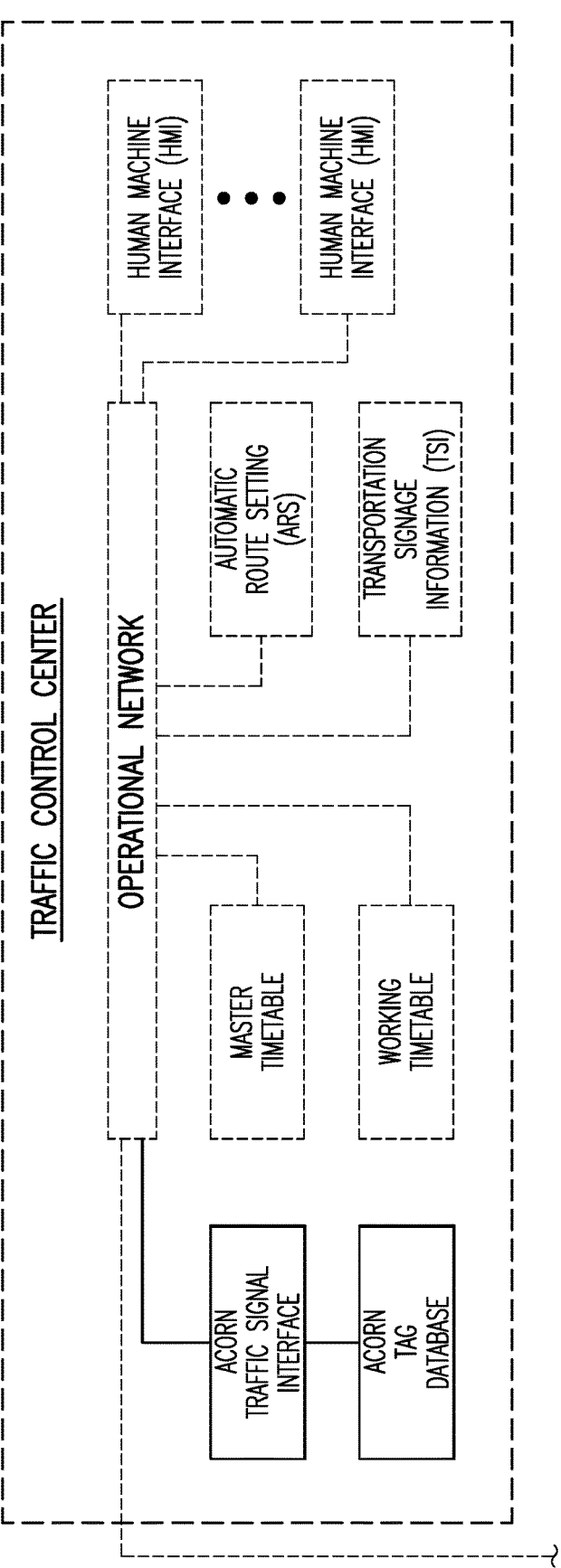
FIG. 5 shows another detail of an operational schematic of an embodiment of a system.
Figure 5B:
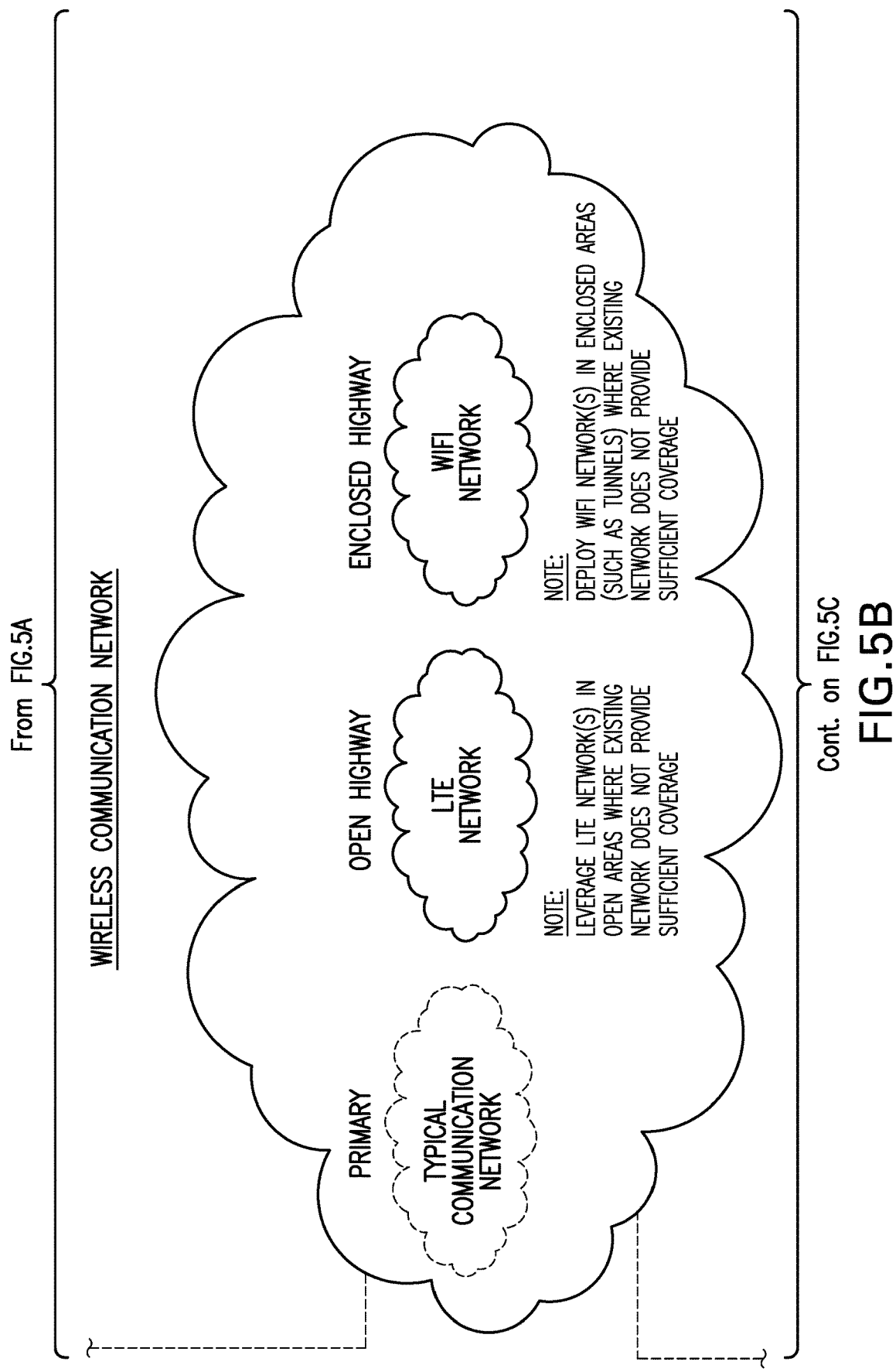
Figure 5C:
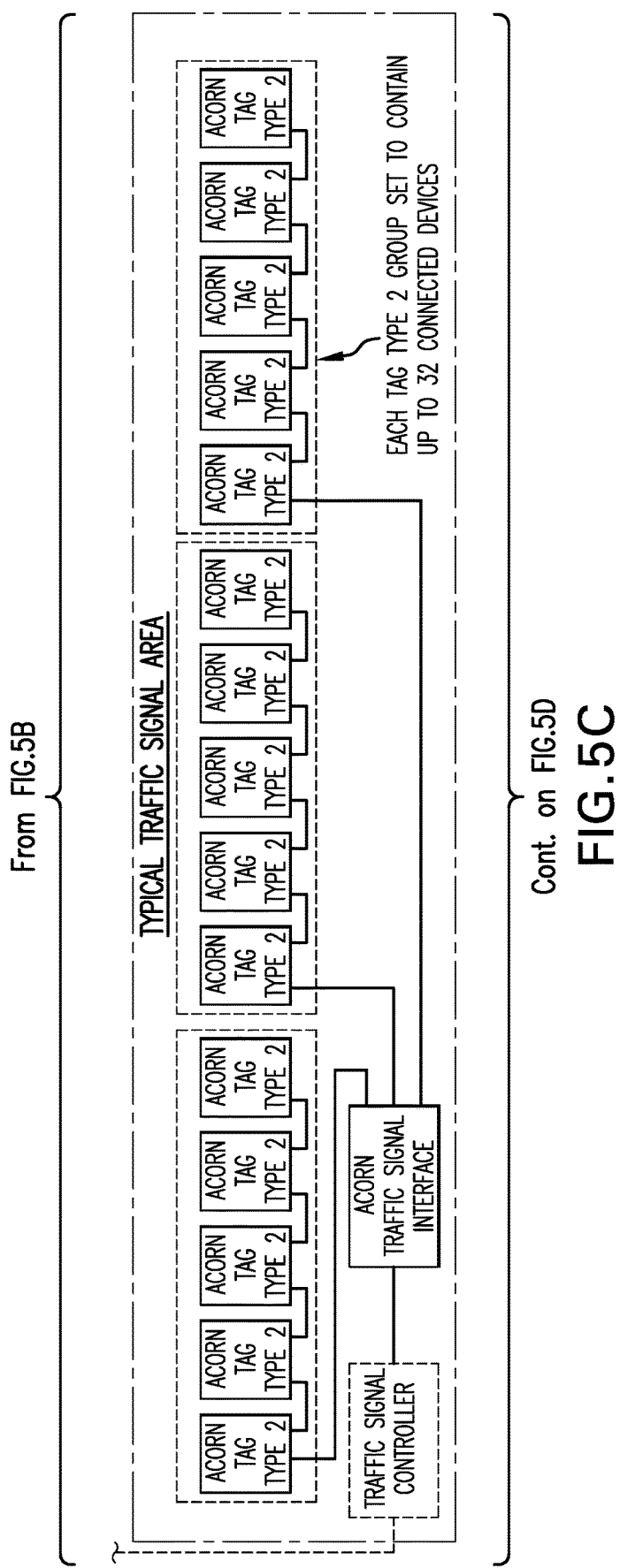

According to an embodiment, the network of the at least one leading vehicle or the at least one trailing vehicle can be connected to a wireless communication network using an LTE network at locations, where the highway points are at an open highway, and a Wi-Fi network at locations where the highway points are at an enclosed highway (as shown in FIG. 4). Alternatively, the communication network could use Ultra-Wide Band (UWB) LWIP, LWA, WLAN, ADSL or Cable networks for communications.

Figure 3:
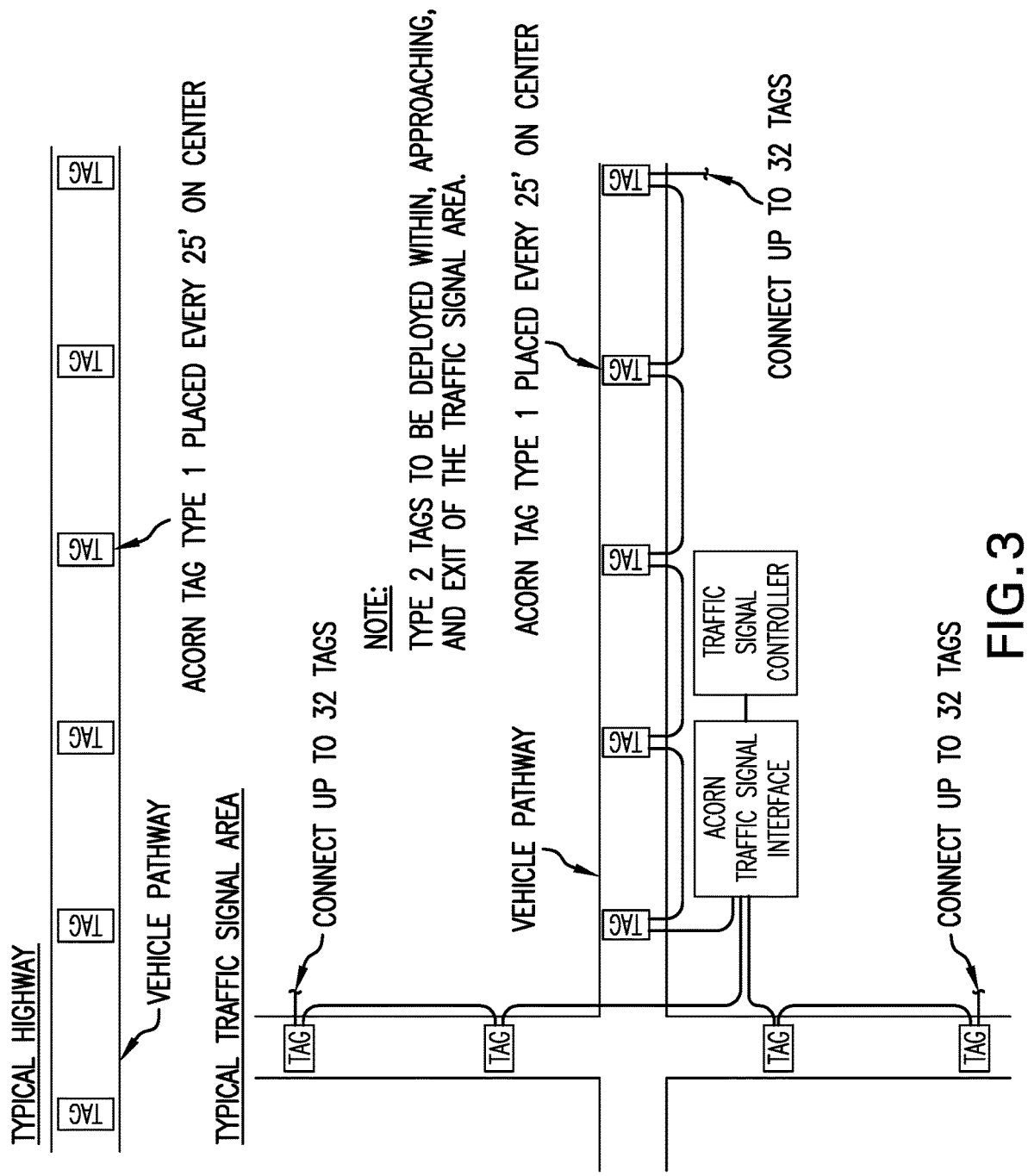
FIG. 3 shows a possible set up of a system along the highway, according to at least some embodiments disclosed herein.

FIG. 3 shows at least a first set of two highway points located along a path of the vehicle to which at least one RFID Type 1 tag (Acorn tag) can be connected and configured to store characteristics of the vehicle as it passes the at least the first set of two highway points. FIG. 3 further shows a second set of two highway points located along a highway traffic signal and at least one RFID Type 2 tag (Acorn tag type 2) located at each of the second set of two highway points. The at least one RFID Type 2 tag (Acorn tag type 2) is configured to store characteristics of the vehicle as it passes the second set of two highway points.

According to an embodiment, the RFID type 2 tag can be connected to a second RFID type 2 tag by an RS485 cable. The RFID type 2 tag can include an I2C to RS485 converter connected to an RFID chip connected by I2C BUS connection, connected by a parallel connection to a tag antenna. According to an embodiment, the RFID type 1 tag and the RFID tag reader have a separation between approximately 7 inches and 40 inches, with the RFID tag reader being located on an underside of the at least one leading vehicle and the underside of the at least one trailing vehicle. According to an embodiment, the RFID type 1 tags are spaced apart between approximately 20 to approximately 30 feet from each other, but optimally 25 feet, as seen in FIG. 3.

Referring now to FIG. 4, a detail of an operational schematic is illustratively depicted, in accordance with an embodiment of the present invention.

The interface at the traffic management center can translate the current vehicle schedule held by the existing system into an Acorn database format, adding additional granularity of target times at each location. As the vehicles report their locations, the interface will emulate its positional reporting as currently used by the traffic management center. The second interface to the existing system is the automatic route setting system. If a route has been changed from that planned, the new routes are converted to an Acorn compatible format and are transmitted to the Acorn operating vehicles. These interfaces allow operation with existing and enabling mixed traffic operation, which can also be shown in FIG. 5.

As shown in FIG. 4, all vehicles within the system will include the Acorn Tag Reader mounted to the underside, Wi-Fi and Bluetooth links between the vehicles, Acorn processing equipment inside or outside the vehicles, WAN antennas on the top of the vehicles, radar collision detector on the front of driver vehicles, and a driver display in driver areas.

The key benefit of the Acorn System is that its introduction into service is by an overlay principle. Highway installation is reduced to a minimum, avoiding disruption to the users of the systems while minimizing time and cost. To avoid cyber-hacks of the tags or communications paths, encryption is applied to all transmissions and stored tag data.

According to an embodiment, introduction of service of the Acorn System will occur seamless as the changeover can be practically overnight.

Further, embodiments of the present invention include a vehicle control system including: at least one leading vehicle, at least one trailing vehicle, at least a first set of two highway points, at least a second set of two highway points, at least one RFID Type 1 tag (Acorn tag), at least one RFID Type 2 tag (Acorn tag 2), and at least one RFID reader. The at least the first set of two highway points are located along a path of the vehicle, to which the at least one RFID Type 1 tag (Acorn tag) can be connected and configured to store characteristics of the vehicle as it passes the at least the first set of two highway points. The at least the second set of two highway points are located along at a traffic signal. The at least one RFID Type 2 tag (Acorn tag 2) are located at each of the at least the second set of two highway points and are configured to store characteristics of the vehicle as it passes the at least the second set of two highway points. The at least one RFID tag reader is located on the at least one leading vehicle and on the at least one trailing vehicle connected to a network.

It is yet another object of the embodiment of the present invention to have a method of controlling a vehicle system. The method includes numerous process steps, such as: having a first vehicle communicate to a second vehicle via a centralized data network radio controlled communication (e.g., a traffic management center). The centralized data network radio controlled communication includes a highway database, a schedule database, and a route database.

The communication between the first vehicle and the second vehicle may also occur via a back-up communication system. The backup communication system (referred to as Mode 1 above) includes: at least a first set of two highway points, at least a second set of two highway points, at least one RFID Type 1 tag, at least one RFID Type 2 tag, and at least one RFID tag reader. The at least the first set of two highway points is located along a path of the first vehicle. The at least one RFID Type 1 tag is located at the at least the first set of two highway points and is configured to store characteristics of the first vehicle as it passes the at least the first set of two highway points. The at least the second set of two highway points is located along at a traffic signal. The at least one RFID Type 2 tag is located at the at least the second set of two highway points and is configured to store characteristics of the vehicle as it passes the at least the second set of two highway points. The at least one RFID tag reader is located on the first vehicle and the second vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A vehicle control system comprising:
   a network;
   at least one highway vehicle;
   at least one first set of two highway points located along a path of the vehicle;
   at least one first RFID tag located at each of the at least one first set of two highway points and configured to store dynamic and static characteristics of the at least one highway vehicle as it passes the at least one first set of two highway points;
   at least one second set of two highway points located along a traffic signal section;
   at least one second RFID tag located at each of the at least one second set of two highway points and configured to store dynamic and static characteristics of the at least one highway vehicle as it passes the at least one second set of two highway points; and
   at least one RFID tag reader located on the at least one highway vehicle connected to the network.

2. The vehicle control system of claim 1,
   wherein the at least one first RFID tag comprises a first RFID Type 1 tag, and
   wherein the at least one second RFID tag comprises a first RFID Type 2 tag.

3. The vehicle control system of claim 2,
   wherein the first RFID Type 2 tag is connected to a second RFID Type 2 tag by an RS485 or serial data transmission cable, and
   wherein the first RFID Type 2 tag comprises an I2C to RS485 converter connected to an RFID chip connected by I2C BUS connection, connected by a parallel connection to a tag antenna.

4. The vehicle control system of claim 1, wherein the at least one RFID tag reader comprises an RF transparent enclosure containing inside at least a pair of reader antennas wired to a chip reader, connected to the at least one highway vehicle.

5. The vehicle control system of claim 2, wherein the at least one first RFID tag and the at least one RFID tag reader have a separation in a range between approximately 7 inches and approximately 40 inches.

6. The vehicle control system of claim 1, wherein the at least one RFID tag reader is located on an underside of the at least one highway vehicle.

7. The vehicle control system of claim 2, wherein the at least one first RFID tag comprises multiple type 1 RFID tags spaced apart by less than approximately 30 feet from each other.

8. The vehicle control system of claim 1, wherein the at least one highway vehicle is connected to a wireless communication network comprising an Ultra-Wide Band, LWIP, LWA, WLAN, ADSL, Cable, or LTE network at locations where the at least one first set of two highway points or the at least one second set of two highway points are at an open highway.

9. The system of claim 1, further comprising:
another highway vehicle.

10. A method of controlling a vehicle system, the method comprising:
communicating from a first vehicle to a second vehicle via a centralized data network traffic management center, wherein the centralized data network traffic management center comprises a highway database, a schedule database, and a route database; and
communicating from the first vehicle to the second vehicle via a communication system, wherein the communication system comprises:
at least a first set of two highway points located along a path of the first vehicle;
at least a second set of two highway points located along a traffic signal;
at least one first RFID tag located at each of the at least the first set of two highway points, wherein the at least one first RFID tag is configured to store dynamic and static characteristics of the first vehicle as it passes the at least the first set of two highway points;
at least one second RFID tag located at each of the at least the second set of two highway points, wherein the at least one second RFID tag is configured to store dynamic and static characteristics of the vehicle as it passes the at least the second set of two highway points;
at least one first RFID tag reader located on the first vehicle; and
at least one second RFID tag reader located on the second vehicle.

11. The method of claim 10,
wherein the first vehicle communicates parameters to the second vehicle via the communication system, and
wherein the parameters are selected from the group consisting of: a speed of the first vehicle, a location of the first vehicle, and a headway of the first vehicle.

12. The method of claim 10,
wherein the at least one first RFID tag comprises a first RFID Type 1 tag, and
wherein the at least one second RFID tag comprises a first RFID Type 2 tag.

13. The method of claim 12, wherein the communication system further comprises:
a backup or a fail-safe system.

14. The method of claim 13, wherein the first RFID Type 1 tag or the first RFID Type 2 tag of the backup system stores a speed, a brake status, a vehicle ID, a traffic signal status, a time stamp, and a schedule of a latest vehicle to pass the first RFID Type 1 tag or the first RFID Type 2 tag.

15. The method of claim 14, further comprising:
rewriting the speed, the brake status, the vehicle ID, the traffic signal status, the time stamp, and the schedule of the latest vehicle to pass the first RFID Type 1 tag or the first RFID Type 2 tag with a next vehicle to pass the first RFID Type 1 tag or the first RFID Type 2 tag.

16. The method of claim 15, wherein the rewriting step is completed within a time range of approximately 10 milliseconds to approximately 30 milliseconds.

17. The method of claim 12, wherein each of the first RFID Type 1 tag and the first RFID Type 2 tag comprise unique identifiers.

18. The method of claim 12, wherein the each of the first RFID Type 1 tag and the first RFID Type 2 tag comprise volatile memory.

* * * * *